US008023562B2

(12) United States Patent
Zheludkov et al.

(10) Patent No.: US 8,023,562 B2
(45) Date of Patent: Sep. 20, 2011

(54) REAL-TIME VIDEO CODING/DECODING

(75) Inventors: Alexander Zheludkov, St. Petersburg (RU); Alexey Martemyanov, St. Petersburg (RU); Nikolay Terterov, St. Petersburg (RU)

(73) Assignee: Vanguard Software Solutions, Inc., Los Altos, CA (US)

( * ) Notice: Subject to any disclaimer, the term of this patent is extended or adjusted under 35 U.S.C. 154(b) by 518 days.

(21) Appl. No.: 12/205,482

(22) Filed: Sep. 5, 2008

(65) Prior Publication Data

US 2009/0067504 A1    Mar. 12, 2009

Related U.S. Application Data

(60) Provisional application No. 60/970,680, filed on Sep. 7, 2007.

(51) Int. Cl.
*H04B 1/66* (2006.01)
(52) U.S. Cl. ......... 375/240.16; 375/240.15; 375/240.12; 375/240.14; 375/240.13; 382/236; 382/238; 382/232
(58) Field of Classification Search ............. 375/240.16, 375/240.15, 240.12, 240.14, 240.13; 382/236, 382/238, 232
See application file for complete search history.

(56) References Cited

U.S. PATENT DOCUMENTS

| | | |
|---|---|---|
| 5,640,208 A | 6/1997 | Fujinami |
| 5,778,190 A | 7/1998 | Agarwal |
| 5,796,435 A | 8/1998 | Nonomura et al. |
| 5,812,788 A | 9/1998 | Agarwal |
| 6,044,115 A | 3/2000 | Horiike et al. |
| 6,055,330 A | 4/2000 | Eleftheriadis et al. |
| 6,081,554 A | 6/2000 | Lee et al. |
| 6,091,777 A | 7/2000 | Guetz et al. |
| 6,233,278 B1 | 5/2001 | Dieterich |
| 6,263,020 B1 | 7/2001 | Gardos et al. |
| 6,317,520 B1 | 11/2001 | Passaggio et al. |
| 6,434,196 B1 | 8/2002 | Sethuraman et al. |
| 6,438,168 B2 | 8/2002 | Arye |
| 6,445,828 B1 | 9/2002 | Yim |
| 6,483,505 B1 | 11/2002 | Morein et al. |
| 6,496,607 B1 | 12/2002 | Krishnamurthy et al. |
| 6,594,395 B1 | 7/2003 | Forchheimer et al. |
| 6,597,739 B1 | 7/2003 | Li et al. |
| 6,683,992 B2 | 1/2004 | Takahashi et al. |

(Continued)

OTHER PUBLICATIONS

M. Schindler, A Fast Renormalisation for Arithmetic Coding, Proc. Data Compression Conference, Mar. 30-Apr. 1, 1998, p. 572, Snowbird, Utah, U.S.A.

(Continued)

*Primary Examiner* — Shawn An
(74) *Attorney, Agent, or Firm* — Fitch, Even, Tabin & Flannery

(57) ABSTRACT

A video codec having a modular structure for encoding/decoding a digitized sequence of video frames in a multi-core system is described. The video codec comprises a memory unit; a multithreading engine. and a plurality of control and task modules organized in a tree structure, each module corresponding to a coding operation. The modules communicate with each other by control messages and shared memory. The control modules control all coding logic and workflow, and lower level task modules perform tasks and provide calculations upon receiving messages from the control task modules. The multithreading engine maintains context of each task and assigns at least one core to each task for execution. The method of coding/decoding comprises denoising, core motion estimation, distributed motion estimation, weighted texture prediction and error resilient decoding.

7 Claims, 4 Drawing Sheets

U.S. PATENT DOCUMENTS

| | | | |
|---|---|---|---|
| 6,909,810 | B2 | 6/2005 | Maeda |
| 6,965,643 | B1 | 11/2005 | Maeda et al. |
| 7,110,459 | B2 | 9/2006 | Srinivasan |
| 2002/0061138 | A1 | 5/2002 | Uenoyama et al. |
| 2005/0024487 | A1 | 2/2005 | Chen |
| 2006/0153539 | A1 | 7/2006 | Kaku |
| 2006/0262860 | A1 | 11/2006 | Chou et al. |
| 2007/0074266 | A1* | 3/2007 | Raveendran et al. ......... 725/135 |
| 2010/0165077 | A1* | 7/2010 | Yin et al. ........................ 348/42 |

OTHER PUBLICATIONS

G. N. N. Martin, Range encoding: an algorithm for removing redundancy from a digitized message, IBM UK Scientific Center (paper presented in Mar. 1979 to the Video & Data Recording Conference held in Southampton Jul. 24-27).

John Watkinson, The Engineer's Guide to Compression, 1996, pp. 62-72, Snell & Wilcox Ltd., Sunnyvale, California, U.S.A.

Yao Wang, Stephan Wenger, Jiangtao Wen, and Aggelos K. Katsaggelos, Review of Error Resilient Coding Techniques for Real-Time Video Communications, IEEE Signal Processing Magazine, Jul. 2000, pp. 61-82, vol. 17, No. 4, USA.

Rui Zhang, Shankar L. Regunathan and Kenneth Rose, Video Coding with Optimal Inter/Intra-Mode Switching for Packet Loss Resilience, IEE Journal On Selected Areas In Communications, Jun. 2000, pp. 966-976, vol. 18, No. 6, USA.

Minyoung Kim, Hyunok Oh, Nikil Dutt, Alex Nicolau and Nalini Venkatasubramanian, PBPAIR: An Energy-efficient Error-resilient Encoding Using Probability Based Power Aware Intra Refresh, Mobile Computing and Communications Review Publication, 2006, pp. 58-69, 10(3), Irvine, California, USA.

* cited by examiner

REAL-TIME VIDEO CODING/DECODING

CROSS-REFERENCE TO RELATED APPLICATION

This application claims benefit of U.S. Provisional Application No. 60/970,680, filed Sep. 7, 2007, and is related to U.S. Pat. No. 7,336,720, issued Feb. 16, 2008, both of which are hereby incorporated herein by reference in their entirety.

FIELD OF THE INVENTION

This application relates to video codec (coder/decoder) systems used preferably for broadcast applications, such as news cameras or studio video manipulation equipment, or as a part of a computer system, which involves real-time or close to real-time video compression and transfer: video conferencing systems, internet video translation systems, video security and surveillance systems, etc.

BACKGROUND OF THE INVENTION

Video codecs are employed to convert initial video sequence (a set of video images, also named pictures, or frames) into encoded bitstream (a set of compressed video sequence binary data), and also converting video sequence binary data produced by a video codec system into a reconstructed video sequence (a decoded set of video images, or reconstructed frames). Hereinafter, the terms "frame" and "picture" are assumed to be identical. It is known that video compression relies on two basic assumptions. The first is that human sensitivity to noise in the picture (frame) is highly dependent on the frequency of the noise. The second is that in a picture sequence every picture has a lot in common with the preceding picture. In a picture large objects result in low spatial frequencies, whereas small objects result in high spatial frequencies. The noise detected by human vision is mostly at low spatial frequencies. The data may be compressed by sending only the difference between one picture and the next, and raising the noise where it cannot be detected, thus shortening the length of data words. Video sequence contains a significant amount of statistical and subjective redundancy within and between pictures that can be reduced by data compression technique to make its size smaller. For still pictures (as in JPEG format), an intra-frame or spatial redundancy is used, which treats each picture individually, without reference to any other picture. In intra-coding the main step is to perform a spatial frequency analyses of the image, using a known technique of Discrete Cosine Transform (DCT). DCT converts input pixels into a form in which the redundancy can be identified. The frame is broken up into rectangular areas called macroblocks and converted a macroblock block at a time. A typical two-dimensional 2D-block is 8×8 pixels. The 2D-DCT converts the block into a block of 64 coefficients. A coefficient is a number which describes the amount of a particular spatial frequency which is present. The coefficients then zig-zag scanned, weighted and run-length coded.

For moving pictures, the mode of inter-coding is known to be used to exploit redundancy between pictures, which gives a higher compression factor than the intra-coding. The "difference" picture is produced by subtracting every pixel in one picture from a pixel in the same position in the next picture. The difference picture may be then compressed using intra-coding with DCT.

In the case of significant movement between the pictures resulting in large differences, it is known to use motion compensation (MC), which allows a higher compression factor. According to the known MC technique, at the coder, successive pictures are compared and the shift of an area from one picture to the next is measured to produce motion vectors. The codec attempts to model the object in the new picture from the previous picture using motion vectors. Each macroblock has its own motion vector which applies to the whole block. The vector from the previous picture is coded and vector differences are sent. Any discrepancies are eliminated by comparing the model with the actual picture. The codec sends the motion vectors and the discrepancies. The decoder does the inverse process shifting the previous picture by the vectors and adding the discrepancies to produce the next picture. The quality of a reconstructed video sequence is measured as a total deviation of it's pixels from the initial video sequence. The increased use of real-time digital video communication applications, such as video conferencing and video telephony presents an ever increasing demand in high video quality.

In view of the increasing use of real-time and close to real time video compression and arrival of a new standard improving quality of the real time video communication, there is a need for new effective algorithms applicable to different types of video codecs, which can be used in the video encoders complying with ITU-T Recommendation H.264, also known as MPEG-4 Part 10, or AVC (ISO/IEC 14496-100), etc.

Most of known block-based video coding systems such as MPEG-4 or ITU-T H.264, use coding algorithms with the common steps of dividing each video frame into blocks of pixels (pels); predicting the block pixels using "inter" prediction, or "intra" prediction technique; transforming texture prediction error blocks; predicting the motion vectors and calculating the motion vector prediction differences; and coding texture prediction error quantized transform coefficients, motion vectors prediction differences, intra prediction types and the auxiliary frame data.

The idea of motion pictures sequence pre-processing using the pixels of current and previous frames was repeatedly treated in the prior art. However, most of such algorithms suffer either from possible over-smoothing due to application of the spatial filters together with temporal ones or from very high complexity. The advantages of the proposed method are: relatively low complexity (depending mostly on the motion estimation, and the way of smoothing the blocks edges) and efficient denoising while preserving good original image details (especially for high noise).

The possibility of creation the error resilient streams is also highly important for the industrial codecs used in broadcasting, streaming and the other applications operating in the error-prone environment. One of the universal classes of the error resilient streams creation methods are intra update methods (also called intra refresh methods). These methods are based on inserting some extra INTRA macroblocks inside the inter-coded frames. These INTRA macroblocks should use for the texture prediction only the reconstructed texture of the previously coded macroblocks of the current frame, which are INTRA coded as well. Thus, all the INTRA macroblocks of each frame will be decoded correctly even if the texture of the previously decoded frames is lost or corrupted. There are several conventional approaches to the INTRA update method.

The simplest approach is to insert the INTRA macroblocks in random positions of the frame with the probability corresponding to the expected loss rate. According to the other approach, the INTRA macroblocks are being inserted into the current frame according to the pre-specified geometric scheme changing from frame to frame by some pre-specified rule. The main drawback of such methods is that they lead to enormous bitrate growth.

Another class of the INTRA update scheme is highly dependent on the current frame texture and motion. In these methods the INTRA macroblocks are being inserted either in the areas of highest activity, determined by the average motion vectors magnitude or using loss-aware rate-distortion optimization scheme under the assumption that the current macroblock may be lost with the given probability. Such methods are described, for example, in the following papers:

Yao Wang, Stephan Wenger, Jiangtao Wen, and Aggelos K. Katsaggelos, "Review of Error Resilient Coding Techniques for Real-Time Video Communication", IEEE Signal Processing Magazine, vol. 17, no. 4, pp. 61-82, July 2000;

R. Zhang, S. L. Regunathan and K. Rose, "Video Coding with Optimal Inter/Intra Mode Switching for Packet Loss Resilience," IEEE Journal on Selected Areas in Communications, Special Issue on Error-Resilient Image and Video Transmission. pp. 966-976, vol. 18, no. 6, June 2000; and Minyoung Kim, Hyunok Oh, Nikil Dutt, Alex Nicolau, Nalini Venkatasubramanian, "PBPAIR: An Energy-efficient Error-resilient Encoding Using Probability Based Power Aware Intra Refresh", ACM SIGMOBILE Mob. Comput. Commun. Rev. 10(3): 58-69, 2006.

The drawback of these schemes is that they do not take into account that high potential reconstruction error caused by the loss of the current macroblock or the previous frame texture will necessarily increase the reconstruction error of the next frames inter macroblocks, which refer to the current macroblock.

In most encoders, which deal with different motion compensation block sizes, a separate motion estimation procedure is used for each block size. This increases the complexity of the motion estimation algorithm and could present a problem in providing efficient interconnections between the motion vectors used in texture blocks of different sizes.

The new H.264 Standard improved the accuracy of the motion vector calculation using a quarter-pel-accurate motion compensation form. However, during motion estimation and motion compensation a quite complicated interpolation procedure is needed for calculating the pixel values with non-integer coordinates. In order to provide an adequate motion estimation using known methods, it is necessary either to store in memory a 4-times-zoomed frame, or to perform a non-integer pixel interpolation during the motion estimation. Both methods have their disadvantages. In the first case a memory storage required for reference frames is increased by 16 times. The second method increases the algorithm computational complexity and leads to an additional CPU load.

The upcoming high-performance systems will integrate tens of multithreaded processor cores on a single chip, resulting in hundreds of concurrent threads sharing system resources. Proposed new modular video encoding and decoding design fit much better to such multi-core systems. It is based on splitting all coding operations into separate "tasks". Such architecture makes possible to load big number of cores even for one-slice-per-picture coding. Another benefit of the proposed design is high flexibility of system integration. One can easily construct any required system (encoder, decoder, transcoder, etc.) from appropriate set of modules. Moreover, such encoder system assembling can be done dynamically, depending on available resources to control load balancing for maximum encoding quality.

SUMMARY

The proposed video codec comprises a plurality of t modules organized in a tree structure, each module corresponding to a coding operation. The codec has a memory unit and a multithreading engine. The task modules communicate with each other by control messages and shared memory. The multithreading engine initializes tasks, sends and handles messages, provides synchronization and communication. The tree structure of the codec is flexible and changeable depending on a number of available cores and tasks. The plurality of modules comprises control modules, which control all coding logic and workflow, and lower level task modules to perform operations and provide calculations upon receiving messages from the control modules. Any task can be executed on any one or more available cores. In order to improve the efficiency, the long lasting calculations are performed by separate modules. The multithreading engine maintains the context of each task and can assign the execution of it to any available module, or several modules. Task to module assignment in multithreading can be controlled by a high level.

A method of encoding/decoding a digitized sequence of video frames in a multi-core system comprises a pre-processing temporal de-noising; core motion estimation; distributed motion estimation; determining whether weighted texture prediction should be used and, if yes, defining the parameters for weighted texture prediction; and decoding encoded sequence of video frames creating error resilience streams using high motion update and low motion update.

DETAILED DESCRIPTION

The encoding system is designed to transform an input video sequence into a compressed bitstream, so that the video sequence can be restored from the bitstream. The proposed video encoding and decoding system has a modular architecture for massive parallelism. The upcoming high-performance systems will integrate tens of multithreaded processor cores on a single chip, resulting in hundreds of concurrent threads sharing system resources. Proposed new modular video encoding and decoding design fit much better into such multi-core systems. It is based on splitting all coding operations into separate "tasks" and provide a plurality of modules to control and perform the tasks. The system comprises a plurality of modules, including task modules and control modules. The modules communicate with each other by control messages and shared memory. Access to the shared memory is restricted, minimized and executed via unified interface. The modules are organized into the "tree graph" structure. This tree structure can be changed dynamically, depending on the number of available cores and tasks, ready to start. Messages are sent from a higher level, or parent, to a lower level, or child, and back from child to parent.

All hard calculations are done in the task modules. They start work after receiving a message from a parent control module, and send the same message back to parent, when finished. Control modules can receive messages from parent modules and child modules, and can send messages to parent and child modules. The control modules control all coding logic and workflow. They should react on each message very quickly. If reaction on some message supposes long calculation, this calculation should be organized as a separate task module.

The tasks initialization, sending and handling messages, synchronization and other communication is implemented via special multithreading engine. This engine is the only part of all source code, which is different for different platform. The rest source code remains unchanged when porting the system from on platform to another.

The tasks and hardware cores are not hard tied to each other. Multithreading engine maintains the context of each task and can execute it on any available core. Moreover, it is possible that one task module utilizes several cores for the particular task execution. Task-to-core assignment in multithreading can be controlled by a high level. The preferable cores for each task can be defined on initialization.

Such architecture makes possible to load big number of cores even for one-slice-per-picture coding. Another benefit of this design is high flexibility of system integration. One can easily construct any required system (encoder, decoder, transcoder, etc.) from appropriate set of these modules. Moreover, such "system assembling" in encoder can be done dynamically, depending on of available resources to control load balancing for maximum encoding quality.

Figure 1:
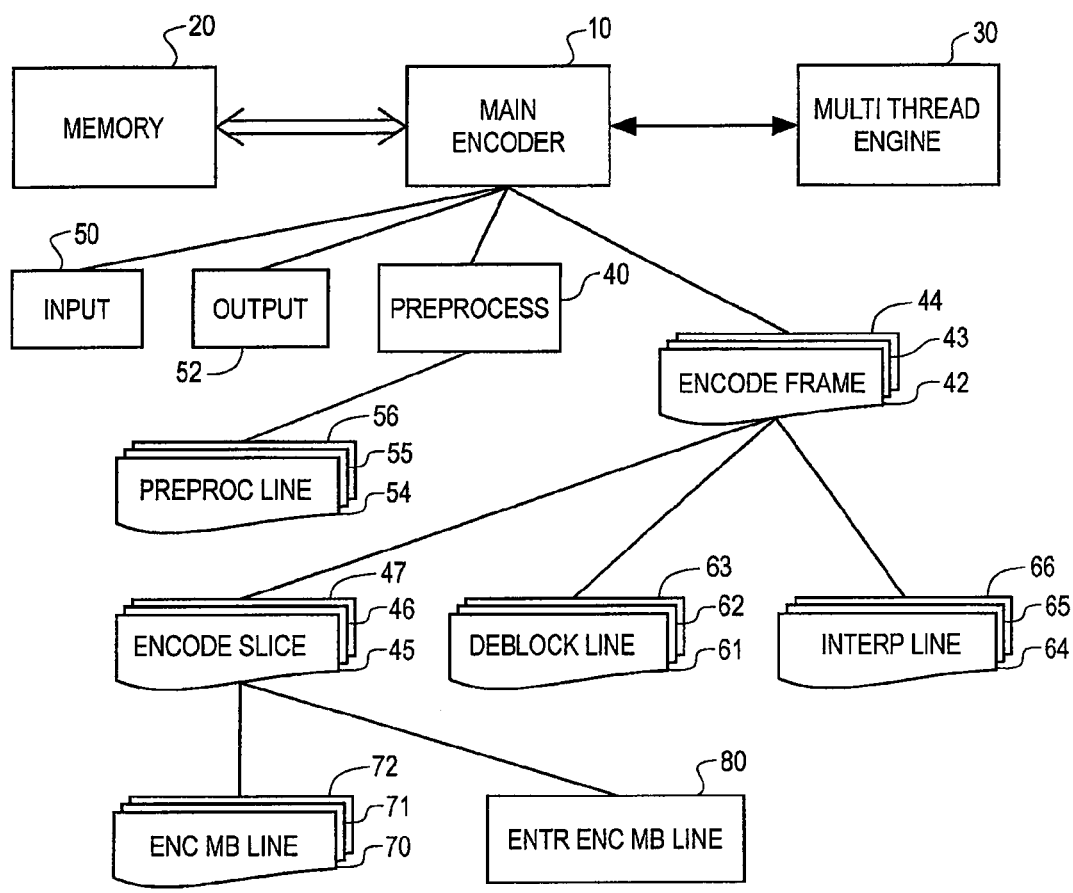
FIG. 1 shows a block-diagram of multi-core modular architecture for massive parallelism.

An example of a task tree of such architecture used for H.264 video encoding is shown in FIG. 1. The system comprises a Memory unit 20 and a Multithreading Engine 30. The plurality of modules includes control modules (C), task modules (T) and calculation modules (TC).

The control modules include:
Main Encoder control module 10;
Preproc control module 40, which controls pre-processing operations;
EncodeFrame control modules 42-44, each module controls one frame encoding tasks. It is possible to activate several simultaneously running tasks of this type for several frames.
EncodeSlice 45-47 control modules, each controls one slice encoding tasks. Each EncodeFrame module can activate several simultaneously running tasks of this type for several slices of one frame.

The task modules include:
Input task module 50—receives raw video frames and stores it into the shared memory;
Output 52—output encoded sequence when ready;
PreprocLine 54-56—each task module pre-processes one line of macroblock. It is possible to activate several simultaneously running task modules of this type for one frame.
DeblockLine 61-63—each task module performs deblocking of one line of macroblocks. Each EncodeFrame module can activate several simultaneously running tasks of this type for several lines in one frame.
InterpLine 64-66—each task module performs half-pel interpolation of one line of macroblocks. Each EncodeFrame module can activate several simultaneously running task modules of this type for several lines in one frame.
EncMbLine 70-72—a task module of this type performs all encoding calculation except entropy encoding, for one line of macroblocks. Each EncodeSlice module can activate several simultaneously running task modules 70-72 of this type for several lines in one slice.
EntrEncMbLine 80—this task module performs entropy encoding for one line of macroblocks. Each EncodeSlice task maintains only one task module of this type and activates it line by line.

The proposed method of encoding/decoding of video sequence in a multi-core system comprises:
pre-processing purely temporal denoising;
encoding the video sequence, including:
core motion estimation;
distributed motion estimation;
determining use of weighted texture prediction from a difference between normalized density functions for luminance histograms of an original frame and luminance histograms of a reference frame and, if used,
calculating parameters for weighted texture prediction; and
decoding encoded sequence of video frames using high motion update and low motion update for error resilience sequence compression quality.

Presented below are the preferred algorithms for each of the method steps.

Purely Temporal De-noising for Video Sequence Visual Quality Improvement

The algorithm comprises the following general steps:
1) Motion estimation—creating a frame P of texture prediction for the current frame from a previous frame and the corresponding motion vectors.
2) Smoothing (deblocking) of the prediction picture.
3) Modifying the current frame based on the current frame pixels and the prediction frame pixels.

1. Motion estimation. At first the motion estimation is performed. Hereafter it is assumed that the motion estimation is performed over the blocks having the size of 8×8. It is also assumed that block-matching criterion for the motion estimation algorithm looks as follows:

$$\text{mv\_cos } t = \text{SAD} + \lambda \cdot (\log_2(\text{abs}(\text{MVD}x)) + \log_2(\text{abs}(\text{MVD}y))),$$

where SAD is the sum of the absolute difference between the pixels of the current block and the pixels of the reference block; $\lambda$ is a pre-defined constant (this is one of the denoising strength parameters, see below), MVDx and MVDy are the differences between the current motion vector components and some prediction motion vector derived from the motion vectors calculated before for the neighboring blocks (for example, one can take for such prediction the median values of the corresponding components for motion vectors of the upper, left and upper-right blocks.)

The results of the motion estimation procedure are:
The set of motion vectors for all picture 8×8 blocks.
The values of mv_cost corresponding to these motion vectors.
The texture prediction blocks of the size 8×8 defined by the reference picture and motion vectors and the prediction picture P composed from these prediction blocks.

The sufficiently large sum of those mv_cost values for all picture motion vectors signals about the scene change. In this case one can either change the reference picture from the previous picture to the successive one and repeat motion estimation for it, or perform no denoising for current picture at all. Since the situations of multiple picture scene change are quite uncommon for typical video sequences, this cannot affect notably the denoising visual effect.

2. Prediction picture deblocking. After the motion estimation and the prediction picture construction the smoothing of 8×8 blocks vertical and horizontal boundaries is performed. This smoothing should be sufficiently strong and may be quite rough. Thus, for example, the following method for smoothing the blocks boundaries is quite suitable. Let's denote as P(x,y) a pixel of the prediction picture with the coordinates (x,y), and as P_res(x,y)—the same pixel of the prediction picture after its smoothing. Consider the block 8×8 with the upper-left pixel coordinates (x,y). If the total boundary difference between this block and its left neighbor is sufficiently large then its left boundary may be smoothed by the linear transform:

$$P_{res}(x+j,y+l)=(P(x-4,y+l)\cdot(4-j)+P(x+3,y+l)\cdot(4+j))/8,$$
(for all $j=\overline{0;3}$ and $l=\overline{0;7}$).

Otherwise, if this boundary difference is sufficiently small then its left boundary may be smoothed by the linear transform:

$$P(x+j,y+l)=(P(x+j,y+l)\cdot 3+P(x-1,y+l))/4, \text{ (for all } j=\overline{0;1}$$
and $l=\overline{0;7}$).

$$y[0]=(y[-4]+y[3]+1)>>1;$$

$$y[1]=(3*y[-4]+5*y[3]+4)>>3;$$

$$y[2]=(y[-4]+3*y[3]+2)>>2;$$

$$y[3]=(y[-4]+7*y[3]+4)>>3;$$

3. Denoising. The final denoising procedure is performed by modifying all the pixels of the current image as follows:

$$I=I+\text{sign}(I-P)\cdot F(\text{abs}(I-P))$$

where I is the pixel of the current image,
P is the same position pixel of the prediction image after the deblocking procedure described above,
abs is the function of absolute value; and
sign is a sign function (sign(x)=−1, if x<0; sign(x)=0, if x=0; and sign(x)=1, if x>0).
Besides that, the denoising is not performed for those current image 8×8 blocks, for which the value of mv_cost exceeds some pre-defined threshold MV_COST_THR. Since such blocks usually correspond to weakly predictable high motion areas, their denoising may be omitted without notable visual quality decrease.

The main algorithm parameters, which control the strength of the noise suppression are $T_0$, $T_1$, $T_2$, $\lambda$ and MV_COST_THR.

One of the key issues of the method is choosing the discrete-time function F. For its derivation the values $T_0$, $T_1$, $T_2$ should be set up so that $0 \leq T_0 < T_1 < T_2$. The function should satisfy the following requirements.

F(D) is sufficiently smooth inside the interval $[0; T_2]$.

$$F(0)=0.$$

$$F(D) \geq D/2 \text{ and } F(D) \leq D, \text{ if } D \in [0; T_0).$$

$$F(D)=D/2, \text{ if } D \in [T_0; T_1).$$

$$F(D) \leq D/2 \text{ and } F(D) \geq 0, \text{ if } D \in [T_1; T_2).$$

$$F(D)=0, \text{ if } D \geq T_2.$$

These properties of the function F(D) together with proper choice of the values $T_0$, $T_1$, $T_2$ provide good smoothing effect together with minimal visual artifacts added.

To complete the description of the algorithm, below are given the instance of the function F(D) providing good noise suppression results and the example values for $T_0$, $T_1$, $T_2$, $\lambda$, MV_COST_THR parameters.
Function F(D).

$$F(D)=D(1-D^2(5T_0-3D)/4T_0^3), \text{ if } D<T_0;$$

$$F(D)=D/2, \text{ if } D \in [T_0; T_1);$$

$$F(D)=D/2+D((D-T_1)^3-2(T_2-T_1)(D-T_1)^2-(T_2-T_1)^2(D-T_1))/4(T_2-T_1)^3, \text{ if } D \in [T_0; T_2); \text{ and}$$

$$F(D)=0, \text{ if } D \geq T_2.$$

To avoid its computation for every pixel of the image the pre-calculated table should be created containint its values for all possible values of abs(I−P). For typical color bit depth 8 this table consists of 256 one-byte numbers.

As an example, the values of $T_0$, $T_1$, $T_2$, $\lambda$, MV_COST_THR for the case of strong noise may be chosen as $T_0=16$, $T_1=32$, $T_2=48$, $\lambda=24$, MV_COST_THR=6000.

Core Motion Estimation

Figure 2:
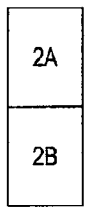
FIG. 2 shows a block-diagram of the motion estimation algorithm of the coding/decoding method.
Figure 2A:
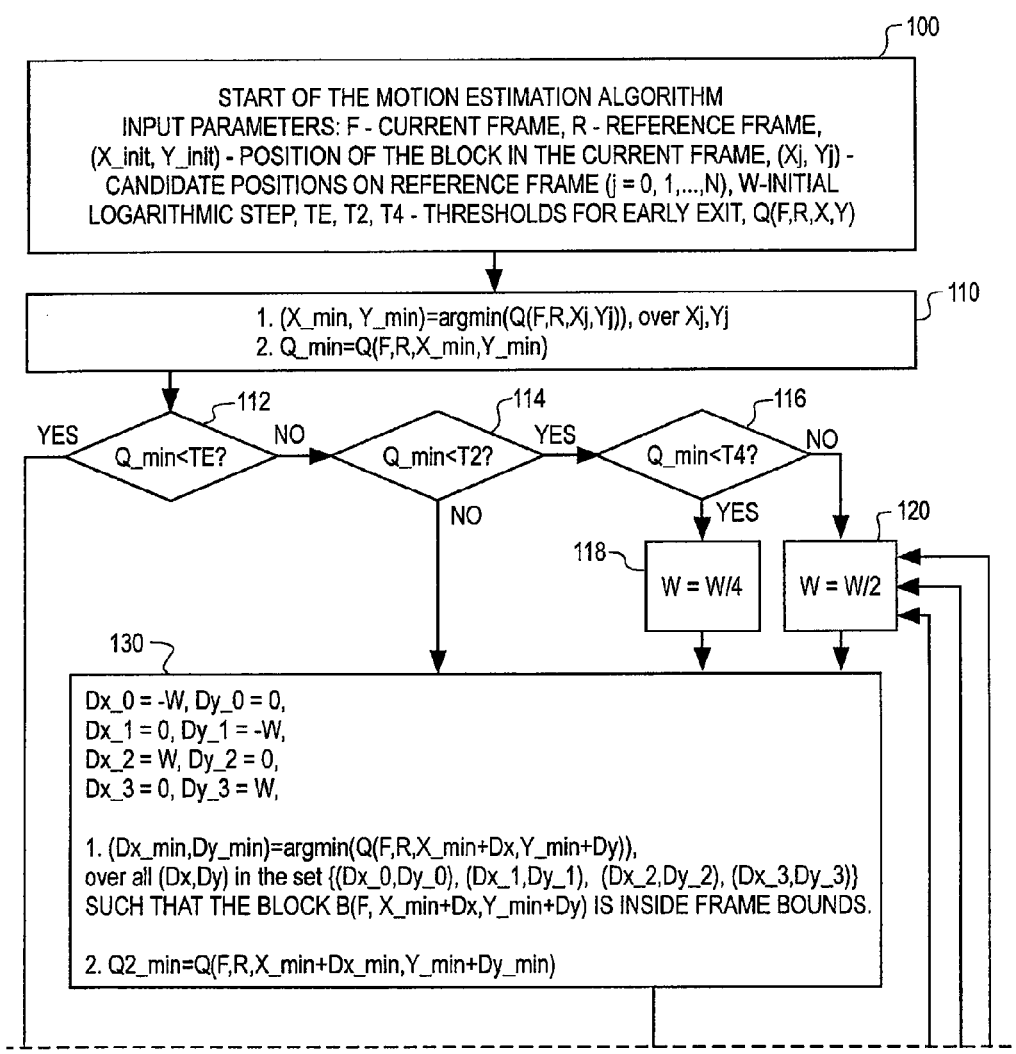
Figure 2B:
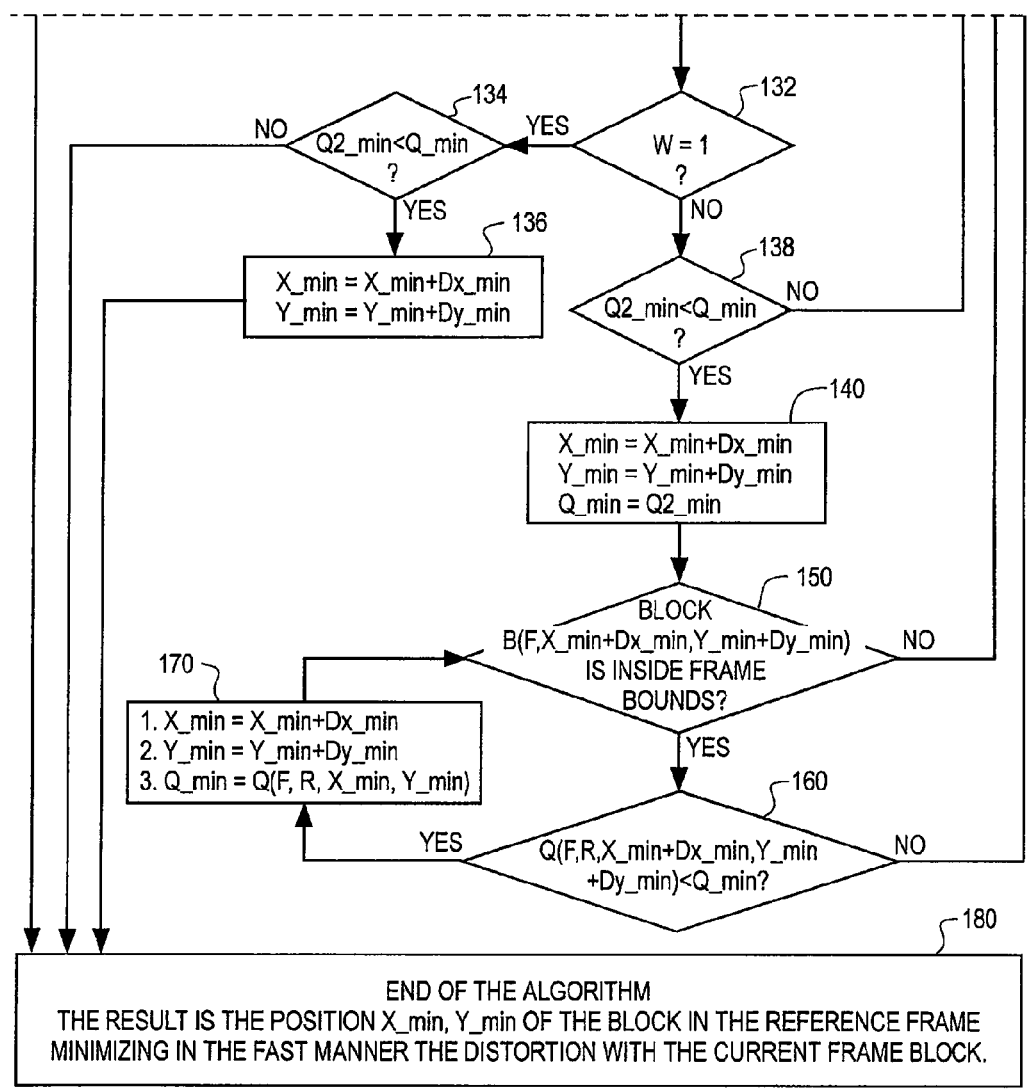

FIG. 2 shows a block diagram of the core motion estimation algorithm. Consider a frame F and a rectangular block of width W and height H inside this frame. Hereafter W and H will be considered as constant values, and the block B(F, $X_{INIT}$, $Y_{INIT}$) as the left-top corner block inside the frame F with coordinates $X_{INIT}$, $Y_{INIT}$. Consider another frame R called a reference frame and a block B(R, X, Y), and some matching criterion Q(F, R, X, Y), which is the measure of similarity between the pixels of the block B(F, $X_{INIT}$, $Y_{INIT}$) and the block B(R, X, Y). The smaller is the value of the function Q, the more similar are the blocks. Hereafter the coordinates $X_{INIT}$ and $Y_{INIT}$ will be assumed constant.

The aim of the algorithm is to find the coordinates X, Y inside the reference frame R, which provide good correspondence between the blocks B(F, $X_{INIT}$, $Y_{INIT}$) and B(R, X, Y) minimizing the matching criterion Q(F,R,X,Y). In particular, if the block B(F, $X_{INIT}$, $Y_{INIT}$) contains some object, which position moves from the reference frame to the current frame, then the values $X_{INIT}$−X and $Y_{INIT}$−Y should estimate well the motion of the object from frame R to frame F.

Let's define the value W, which is supposed to be the power of 2 and following values, which will be used as thresholds for the function Q(F,R, X, Y):
TE—threshold for exiting the algorithm after candidates check;
T2—threshold for halving the search range during the logarithmic search;
T4—threshold for dividing in 4 the logarithmic search.

Suppose we have already find the best values of (X, Y) for some of the neighboring blocks of block B(F, $X_{INIT}$, $Y_{INIT}$) and some other pairs (X,Y), which are likely to be close to the coordinate pair for the current block which we are looking for. Let's call all these N pairs $(X_j, Y_j)$ where j=0, 1 . . . N, as candidates.

The first step of the algorithm is to calculate the values of Q(F,R, $X_j$,$Y_j$) for all candidates. If the minimal value of Q(F,R, $X_j$,$Y_j$), j=0, 1, . . . N is less than TE then the algorithm comes to an end and this pair ($X_{MIN}$, $Y_{MIN}$), providing the minimum of Q(F,R, $X_j$,$Y_j$), is considered as the result of the algorithm.

Otherwise denote $Q(F,R, X_j, Y_j)$ as $Q_{MIN}$ and fulfill the following procedure.

Step 1. If $Q_{MIN}<T2$ then $W=W/2$, else if $Q_{MIN}<T4$ then $W=W/4$. If $W<1$, exit the algorithm: the result of the algorithm is the pair $(X_{MIN}, Y_{MIN})$.

Step 2. Define four pairs $(Dx_0, Dy_0) = (-W, 0),$ $(Dx_1, Dy_1) = (0, -W),$ $(Dx_2, Dy_2) = (W, 0),$ and $(Dx_3, Dy_3) = (0, W).$ Calculate the values of $Q(F,R, X_{MIN}+Dx_0, Y_{MIN}+Dy_0)$, $Q(F,R, X_{MIN}+Dx_1, Y_{MIN}+Dy_1)$, $Q(F,R, X_{MIN}+Dx_2, Y_{MIN}+Dy_2)$, and $Q(F,R, X_{MIN}+Dx_3, Y_{MIN}+Dy_3)$.

Find the pair $(Dx_j, Dy_j)$ ($j=0 \ldots 3$) providing the minimal value of $Q(F,R, X_{MIN}+Dx_j, Y_{MIN}+Dy_j)$. Denote this pair as $(Dx_{MIN}, Dy_{MIN})$.

If $Q(F,R, X_{MIN}+Dx_{MIN}, Y_{MIN}+Dy_{MIN}) >= Q_{MIN}$ then go to the Step 5.

Step 3. Calculate the values $Q(F,R, X_{MIN}+j*Dx_{MIN}, Y_{MIN}+j*Dy_{MIN})$ for increasing $j=0, 1, 2 \ldots J$ until the following inequality (I) is true or the boundary of the frame is reached:

$$Q(F,R,X_{MIN}+j*Dx_{MIN},Y_{MIN}+j*Dy_{MIN}) <= Q(F,R,X_{MIN}+(j+1)*Dx_{MIN},Y_{MIN}+(j+1)*Dy_{MIN}), \quad (I)$$

where J is the minimal nonnegative integer value of j for which the inequality above is true.

Step 4. Set $X_{MIN}=X_{MIN}+J*Dx_{MIN}$, $Y_{MIN}=Y_{MIN}+J*Dy_{MIN}$, and $Q_{MIN}=Q(F,R, X_{MIN}, Y_{MIN})$, where J is obtained in the previous step.

Step 5. Set $W=W/2$. If $W \neq 1$ then return to the Step 1. Otherwise the result of the algorithm is one of the coordinate pairs $(X_{MIN}, Y_{MIN})$, $(X_{MIN}+Dx_{MIN}, Y_{MIN}+Dy_{MIN})$, $(X_{MIN}-Dx_{MIN}, Y_{MIN}+Dy_{MIN})$, $(X_{MIN}+Dx_{MIN}, Y_{MIN}-Dy_{MIN})$, $(X_{MIN}-Dx_{MIN}, Y_{MIN}-Dy_{MIN})$ which provides the minimum of the function $Q(F,R, X,Y)$.

Note 1. The arguments X, Y of the function $Q(F,R, X,Y)$ may be measured not in integer coordinates but also in half-pixels, quarter-pixels, etc. In the case of non-integer block coordinates it is assumed that such block pixels can be retrieved from the frame R pixels by some pre-defined interpolation procedure.

Note 2. One can see that the values of $Q(F,R, X,Y)$ are calculated sometimes more than once for the same pair $(X,Y)$. For example, at least three of five coordinate pairs of the Step 5 were used in the Step 2 and Step 3. Evidently, such repeated calculations should be identified and eliminated during the practical implementation of the method.

Note 3. The initial value of W, the quality function $Q(F,R, X,Y)$ and the values TE, T2, T4 are the parameters of the algorithm controlling the threshold between the motion estimation speed and the motion estimation quality.

Distributed Motion Estimation

The motion estimation algorithm described in previous section can be applied directly for encoding video frames. We call it here "core" algorithm. It provides good results for video of QCIF, CIF and D1 resolution. However, it could be improved for high-definition video, where the dimension of one block is essentially less then the dimension of the whole picture. Similar improvement may be used when the reference frames are separated by several non-reference frames. For such situation the following high level additions to the motion estimation algorithm can be applied.

Consider successive pictures to be coded as $F_1, F_2, F_3, F_4 \ldots$ and for the pictures $F_2, F_3, F_4$ only the picture $F_1$ can be used as reference. So we need only $F_2$ to $F_1$, $F_3$ to $F_1$ and $F_4$ to $F_1$ motion vectors. The block size for motion estimation can be 16×16, 16×8, 8×16 and 8×8.

The following algorithm is applied:

1. Calculate and store spatially reduced pictures $f_1, f_2, f_3,$ and $f_4$ Reduction coefficient can be 2 or 4 in each spatial dimension.

2. Select reduced block size in reduced pictures as 8×8.

3. Calculate and store motion vectors for the following reduced pictures pairs: $f_2$ to $f_1$, $f_3$ to $f_2$ and $f_4$ to $f_3$. This motion estimation is done using core motion estimation algorithm described above.

4. Having motion vectors sets $f_2$ to $f_1$ and $f_3$ to $f_2$ calculate $f_3$ to $f_1$ motion vectors as follows:

For each block $b_3$ of $f_3$ let $(p_x, p_y)$ be the center point and $(m_x, m_y)$ be the motion vector set from $f_3$ to $f_2$. Select the block from $f_2$ picture where the pixel $(p_x+m_x, p_y+m_y)$ resides. Let $(n_x, n_y)$ be the motion vector from $f_2$ to $f_1$ set for this block. Assign $(n_x+m_x, n_y+m_y)$ as a motion vector of the block $b_3$ in the $f_3$ to $f_1$ motion vectors set.

5. Similar to 4, having $f_3$ to $f_1$ and $f_4$ to $f_3$ motion vectors sets calculate $f_4$ to $f_1$ motion vectors:

For each block $b_4$ of $f_4$ let $(p_x, p_y)$ be the center point and $(m_x, m_y)$ the motion vector from $f_4$ to $f_3$ set. Select the block from $f_3$ picture where the pixel $(p_x+m_x, p_y+m_y)$ resides. Let $(n_x, n_y)$ be the motion vector from $f_3$ to $f_1$ set for this block. Assign $(n_x+m_x, n_y+m_y)$ as a motion vector of the block $b_4$ in the $f_4$ to $f_1$ motion vectors set.

6. For each block $B_i$ of picture $F_i$ (i=2, 3, 4) take motion vector from appropriate block of reduce picture and scale it back according to the picture reduction coefficient in each dimension. This will be coarse full-pel motion vector for this block. Apply core motion estimation algorithm to find fine full-pel motion vector using this coarse motion vector as an additional candidate and reducing search range to 2 or 4 depending on the picture reduction coefficients.

7. For each block $B_i$ of picture $F_i$ (i=2, 3, 4) apply core motion estimation algorithm to find quarter-pel motion vector using fine full-pel motion vector as a starting point and the search range 2.

Using these additional algorithm has following benefits:

It separates different stages of motion estimation, so that they can be implemented on different processors or processor cores.

It utilizes information from the intermediate frames even if these frames are not used as references in actual encoding.

It reduces the range of memory access, which can be critical on the systems with low cash capabilities.

Weighted Prediction Detection Using Histograms

Typically inter-coding of picture block use some block of already coded reference picture as a prediction of this block and then encode the difference between prediction and block itself. I.e., prediction of the block of pixels $P(x,y)$ is calculated as $L(x+mx, y+my)$, where $L(x,y)$ is luminance values of reference pictures and $(mx,my)$ is the motion vector for this block. H.264 video standard allows using weighed prediction for inter-pictures coding. That means that prediction of the block of pixels $P(x,y)$ is calculated as $A*L(x+mx, y+my)+B$, where A and B are weighted prediction parameters, common for all blocks of the coded picture. The problem for encoder is the fast detection of video fragments, where this tool should be used and to determine weighted prediction parameters. Here we describe fast algorithm to detect such situations.

Inputs for this algorithm are luminance histograms of reference frame and frame to be encoded. Output is a flag, whether to use weighted prediction or not. If Algorithm decides to use weighted prediction, it returns also the parameters of weighted prediction for this inter encoded picture.

The luminance histogram of a picture (Hist) is unsigned integer array of size MAX_LUM_VAL+1.
Hist[i] is the number of pixels in the picture, with luminance value=i. MAX_LUM_VAL depends of the number of bits used to represent pixel luminance. The histogram is an approximation of probability density function if the luminance value of the pixels is considered as random value.

This algorithm is based on the assumption that in the case when weighted prediction is applicable, i.e. one frame is well predicted by the weighted prediction formula, the shape of probability density functions for both frames should be similar. This similarity is detected using the following obvious fact:

If P is a random variable with mean M and deviation $S^2$, then $P_n=(P-M)/S$ is a random value with mean=0 and deviation=1, where $P_n$ as normalization of P. Probability density function of $P_n$ random value can be easily calculated from the probability density function of P.

In case when the weighted prediction is applicable, the normalized probability density functions for reference and original frames should be approximately the same. Having histograms of both original and references frames Ho and Hr, the normalized density functions for both can be estimated and compared. If the difference is lower then some predefined threshold, the weighted prediction should be applied.

Parameters A and B are calculated from the equations for mean and deviation for the reference and the original frames:

$$A=So/Sr; B=Mo-A*Mr$$

Comparing of normalized density functions is done without explicit calculation of these functions, using the following fast implicit algorithm:

Input for this algorithm is: Hist0 and Hist1—histograms of original and reference frames.

Output is the flag whether weighted prediction should be applied and its parameters A and B.

The part of the histogram Hist[$i_s$,$i_e$] is defined by starting and ending indexes $i_s$ and $i_e$. Any histogram part can be considered as the distribution of some separate stochastic variable. The following values can be calculated for any part of the histogram:

$$S(i_s,i_e,\text{Hist})=\text{Hist}[i_s]+\text{Hist}[i_s+1]+\text{Hist}[i_s+2]+\ldots+\text{Hist}[i_e]$$

$$M(i_s,i_e,\text{Hist})=i_s*\text{Hist}[i_s]+(i_s+1)*\text{Hist}[i_s+1]+(i_s+2)*\text{Hist}[i_s+2]+\ldots+i_e*\text{Hist}[i_e]$$

$$C(i_s,i_e,\text{Hist})=M(i_s,i_e,\text{Hist})/S(i_s,i_e,\text{Hist}), \text{ where}$$

$C(i_s, i_e, \text{Hist})$ is "center of mass" of the particular part of histogram.

Taking $i_c=\text{round}(C(i_s, i_e, \text{Hist}))$, we obtain 2 new histogram parts, defined by 2 index pairs $(i_s, i_c)$ and $(i_c, i_e)$. We call it low subpart and high subpart. Obviously, if histogram parts of 2 different frames Hist0[$i0_s$,$i0_e$] and Hist1[$i1_s$,$i1_e$] has closed normalized densities, and $S(i0_s, i0_e, \text{Hist0})$ is approximately equal to $S(i1_s, i1_e, \text{ist1})$, same can be said about the pair Hist0[$i0_s$, $i0_c$], Hist1[$i1_s$, $i1_c$] and the pair Hist 0[$i0_c$, $i0_e$], Hist1[$i1_c$, $i1_e$]. Hence $S(i0_s, i0_c, \text{Hist0})$ should be approximately equal to $S(i1_s, i1_c, \text{Hist1})$, and $S(i0_c, i0_e, \text{Hist0})$ should be approximately equal to $S(i1_c, i1_e, \text{Hist1})$.

The algorithm starts with the whole histograms, checks the above approximate equality and applies itself recursively to each subpart pairs. Recursion depth of 3-4 is quite enough to detect weighted prediction cases. Note that this algorithm can be further speedup if the sums S(0, i, Hist) for all i=0, 1, . . . 255 are pre-calculated.

INTRA or INTER Mode of Encoding

The frame encoder may work in INTRA or INTER mode.

In the INTRA mode, a picture is broken into 16×16 macroblocks, which in turn may be broken into 16×16 or 4×4 blocks (the fragmentation can be different for different macroblocks of a picture). The macroblocks are coded sequentially row-by-row left to right. The blocks of each macroblock are coded in the same order. The pixel values for each block may be predicted from the already coded blocks by using several prediction schemes. A known technique of Discrete Cosine Transform (DCT) is applied to every texture prediction error block. The texture difference from the prediction is transformed into frequency domain with two-dimensional DCT (2D-DCT) transform. The transform coefficients are quantized, reordered, coded and then coded arithmetically.

In the INTER mode, the picture is also broken into 16×16 macroblocks that are coded row-by-row, left-to-right. Each macroblock can be intra or inter coded. All data is coded with arithmetic encoder. For the inter coding, the block-match motion compensation from up to 2 reference frames is used. The intra coding is identical to that described above. For inter coding, a macroblock is broken into 16×16, 8×8, 16×8, 8×16, 4×8, 8×4 or 4×4 blocks. For each block, a motion vector to one of the reference frames is transmitted that provides the best prediction of the block pixels in block match. The texture difference from the prediction is coded as in the intra mode.

Figure 3:
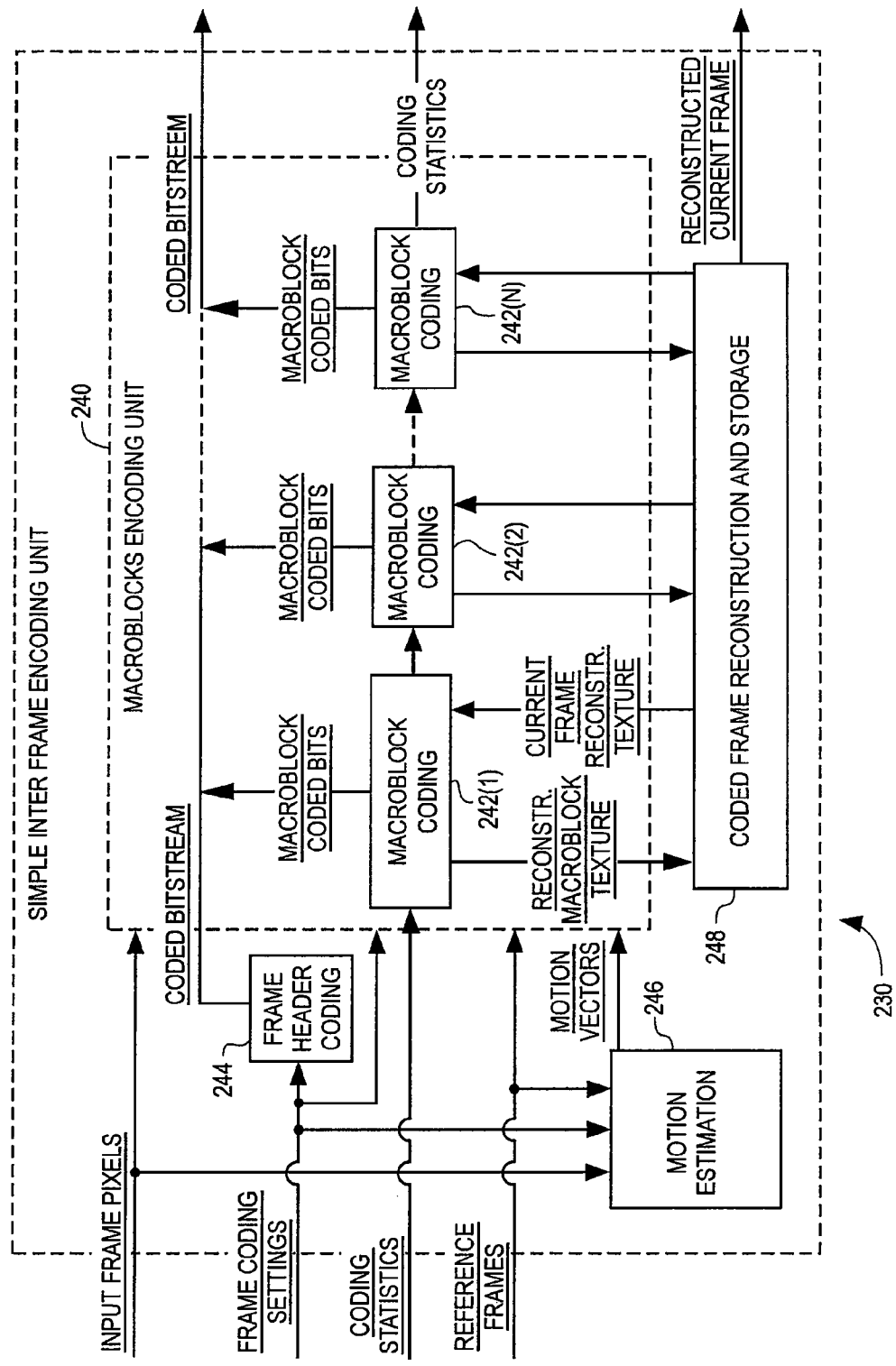
FIG. 3 shows a block-diagram of a simple inter frame encoding unit.

FIG. 3 schematically presents a Simple Inter Frame Encoding Unit 30. The encoding unit 30 includes a Macroblock Encoding unit 42, which is a frame texture coding unit corresponding to 16×16 frame texture blocks; a Frame Header Coding unit 44, which includes a set of parameters for proper frame decoding. Encoding of these parameters does not involve arithmetic coding, each parameter is coded as an integer number with a minimal necessary number of bits according to the range of the parameter value. The encoding unit 30 also includes a Motion Estimator 46, which performs motion estimation procedures. First, the picture area is divided into blocks of size M×N. For each block whose left-top corner is located in (x_init,y_init) point of the image, wherein x_init is the multiple of M and y_init is the multiple of N, a two-dimensional shift value (x_shift, y_shift) is calculated, so that M block on the reference frame whose left-top corner is located in the point (x_init+x_shift, y_init+y_shift) is the prediction. The Coded Frame Reconstruction and Storage unit 48 provides the intra macroblock texture prediction and/or inter macroblock texture prediction.

The INTRA macroblock texture prediction is the prediction for the current macroblock texture, which involves only reconstructed texture of the previously coded macroblocks from the same frame.

The Inter macroblock texture prediction is the prediction for the current macroblock texture, which involves the reconstructed texture of the previously coded frames. The frame is called inter frame if it contains inter predicted macroblocks.

The Intra prediction mode includes 8 different algorithms, which are used for the intra macroblock texture prediction.

In the Inter prediction mode the macroblock area is divided into 8 subdivisions, which are 8 rectangular blocks with width and height either 8 or 16, each rectangular block having a corresponding separate motion vector which is used for the intra prediction.

Error Resilience

For the error resilience the following algorithm of the INTRA refresh is proposed.

Hereafter we suppose the frame is divided in 16×16 blocks called macroblocks, each of which may be coded as INTER macroblock, using the previous frames reconstructed texture for coding, and INTRA macroblock, using for coding only the current frame reconstructed texture. Hereafter it is supposed that the video sequence frames, for which the algorithm is applied, are coded consequently in display order; for each macroblock (texture block of the size 16×16) of the inter frame the following values calculated: motion vector to the reference frame, motion vector prediction via the neighboring macroblocks motion vectors and the values cost_intra and cost_inter; such that the INTRA coding mode for this macroblock in regular situations shall be chosen if cost_intra<cost_inter.

The essence of the method is as follows. If in some of the sequence frames there are regions that are lost or corrupted, then the main temporally spreading visual defects are produced by the moving regions. The high motion regions produce strong bad artifacts immediately (and these artifacts will immediately be noticed by the viewer) if the texture of at least one of the current, previous or next to the motion frame is corrupted. That is why only by inserting INTRA macroblocks at the motion areas in several consequent frames around the current frame, the temporal spreading of these artifacts may be effectively terminated. If the texture of low motion regions is corrupted in the decoder then the viewer will not see the appreciable visual artifacts immediately after the texture corruption. So there is no need to insert the INTRA macroblocks right after the motion. However, these visual defects will consequently cumulate and grow and will be terminated successfully at most after the pre-defined number of frames by low motion INTRA update procedure. Besides the large motion vectors, the indirect sign of the area that may cause the artifacts in the corrupted stream decoding is the closeness of the values of functions cost_intra and cost_inter.

Let's define the following values, characterizing the temporal distances between frames:
$T_H$—high motion INTRA update period;
$T_L$—low motion INTRA update period; and
D—high motion INTRA update depth.

Let's define the following values, concerning the thresholds for the motion vectors components:
$MVT_L$—low motion threshold for the motion vector components absolute values sum;
$MVT_H$—high motion threshold for the motion vector components absolute values sum;
$MVTD_L$—low motion threshold for the motion vector prediction differences components absolute values sum;
$MVTD_H$—high motion threshold for the motion vector prediction differences components absolute values sum;
Let's define the following values, which will be used as scaling factors:
$K_H$—INTRA cost scaling factor for high motion frames,
$K_L$—INTRA cost scaling factor for low motion frames.

Let's call each $T_L$-th frame of the video sequence, for which the algorithm is applied, as low motion update frame and each $T_H$-th frame of the sequence as high motion update frame.

Let's consider the macroblock as high motion macroblock if the sum of absolute values of its motion vector components is greater or equal to $MVT_H$ and if the sum of absolute values of its motion vector prediction difference components is greater or equal to $MVTD_H$. Let's consider the macroblock as low motion macroblock if the sum of absolute values of its motion vector components S satisfies the inequality $MVT_L<=S<MVT_H$ and if the sum of absolute values of its motion vector prediction difference components SD satisfies the inequality $MVTD_L<=SD<MVTD_H$.

Let's also define for each macroblock the set C(T) of T macroblocks including this macroblock itself and the macroblocks from the previous frames located at the same position as this macroblock.

Based on the definitions above it is proposed to make the choice between INTRA and INTER coding mode for each macroblock of the high and low motion update frames according to the following rules:
1. For high motion update frames: the macroblock shall be coded as INTRA if for this macroblock the following inequality is true: cost_intra·$K_H$<cost_inter and the set C(D) contains at least one high motion macroblock.
2. For low motion update frames: the macroblock shall be coded as INTRA if for this macroblock the following inequality is true cost_intra·$K_L$<cost_inter and the set C($T_L$) contains at least one high or low motion macroblock.

Despite the apparent simplicity, the proposed intra update scheme shows very high efficiency and avoids the drawbacks of the known intra update schemes. The main point of the algorithm is the ability of moving areas stacking even if the motion stopped several frames ago; the various experiments show the necessity of such stacking. The extra INTRA macroblocks are sufficient for effective terminating of noticeable artifacts and these macroblocks are placed mostly in the positions where they will not cause essential bitrate growth with respect to the INTER macroblocks. However, no unnecessary INTRA macroblocks are inserted, keeping the error resilient sequence compression quality at reasonable level.

The preceding description is intended to be illustrative of the principles of the invention, and it will be appreciated that numerous changes and modifications may occur to those skilled in the art, and it is intended in the appended claims to cover all those changes and modifications which fall within the true spirit and scope of the present invention.

The invention claimed is:
1. A method of encoding, a digitized sequence of video frames in a multi-core system, the method comprising:
    performing core motion estimation;
    determining weighted texture prediction use from a difference between normalized density functions for luminance histograms of an original frame and of a reference frame; and
    calculating parameters for weighted texture prediction;
    wherein the core motion estimation comprises:
        dividing a current video frame and a reference video frame into blocks of pixels;
        defining in the current frame an initial block B(F, $X_{INIT}$, $Y_{INIT}$) with coordinates $X_{INIT}$, $Y_{INIT}$;
        selecting in the reference frame a plurality of N candidate blocks with coordinates ($X_j$, $Y_j$) where j=0, 1 . . . N, using a predetermined criterion; and
        performing core motion estimation for the current frame based on similarity between pixels of a block of the current frame and pixels of blocks of the reference frame;

wherein the motion estimation comprises:
   calculating values of a function of distortion $Q(F, R, X_j, Y_j)$ for all N candidate blocks; and
   comparing minimum values of $Q(F, R, X_j, Y_j)$ with predetermined thresholds to find coordinates for motion estimation $X_j=X_{MIN}$, $Y_j=Y_{MIN}$ from the function of distortion having a lowest value: $Q_{MIN}=Q(F, R, X_{MIN}, Y_{MIN})$.

2. The method of claim 1, wherein the motion estimation algorithm comprises:
   calculating $Q(F,R, X_{MIN}+j*Dx_{MIN}, Y_{MIN}+j*Dy_{MIN})$ for increasing j until inequality (I) is true, or a boundary of the frame is reached:

$$Q(F,R,X_{MIN}+j*Dx_{MIN},Y_{MIN}+j*Dy_{MIN}) \le Q(F,R,X_{MIN}+(j+1)*Dx_{MIN},Y_{MIN}+(j+1)*Dy_{MIN}) \quad (I)$$

where j=0, 1, 2 . . . J, and J– is minimum nonnegative integer value for which the inequality (I) is true; Dx and Dy are steps in horizontal and vertical direction;
   defining parameters $X_{MIN}=X_{MIN}+J*Dx_{MIN}$, $Y_{MIN}=Y_{MIN}+J*Dy_{MIN}$;
   calculating $Q_{MIN}=Q(F, R, X_{MIN}, Y_{MIN})$;
   finding one resulting coordinate pair $X_{MIN}$, $Y_{MIN}$ for $Q_{MIN}=Q(F,R, X_{MIN}, Y_{MIN})$ from the following coordinate pairs:

$(X_{MIN}+Dx_{MIN}, Y_{MIN}+Dy_{MIN})$;

$(X_{MIN}-Dx_{MIN}, Y_{MIN}+Dy_{MIN})$;

$(X_{MIN}+Dx_{MIN}, Y_{MIN}-Dy_{MIN})$, and $(X_{MIN}-Dx_{MIN}, Y_{MIN}-Dy_{MIN})$.

3. A method of encoding a digitized sequence of video frames in a multi-core system, comprising distributed motion estimation for encoding successive frames using one reference frame and the core motion estimation algorithm of claim 2, wherein the distributed motion estimation comprises:
   reducing frame size using reduction coefficient in each spatial dimension;
   calculating and storing a plurality of spatially reduced frames;
   selecting reduced block size in reduced frames as 8×8;
   calculating and storing motion vector sets for reduced frame pairs using the core motion estimation algorithm;
   up-scaling the motion vectors for each block according to the reduction coefficients in each dimension and defining a rough full-pel motion vector for each block of an up-scaled frame;
   calculating a full-pel motion vector by applying the core motion estimation algorithm to the rough full-pel motion vector as an additional candidate, and reducing search range according to the reduction coefficients; and
   calculating a quarter-pel motion vector for each block by applying the core motion estimation algorithm to the full-pel motion vector as a starting point and a search range of 2.

4. A method of encoding a digitized sequence of video frames in a multi-core system, the method comprising:
   performing core motion estimation;
   determining weighted texture prediction use from a difference between normalized density functions for luminance histograms of an original frame and of a reference frame; and
   calculating parameters for weighted texture prediction;
   wherein the weighted texture prediction comprises:
      performing estimate for normalized density functions for histogram $H_o$ of the original frame and histogram $H_r$ of the reference frame;
      comparing the difference between the density function for $H_o$ and the density function $H_r$ with a predetermined threshold, and determining that the weighted prediction is to be applied if the difference is less than the threshold; and
      calculating weighted prediction parameters A and B for at least one block of pixels $P(x, y)$:

$A*L(x+mx, y+my)+B$:

$A=So/Sr$; and $B=Mo-A*Mr$;

where $L(x, y)$ is luminance of the reference frame;
      (mx, my) is motion vector for the block $P(x, y)$;
      So is deviation for the original frame;
      Sr is deviation for the reference frame;
      Mo is mean value for the original frame; and
      Mr is mean value for the reference frame.

5. A method of encoding a digitized sequence of video frames in a multi-core system, the method comprising:
   performing core motion estimation;
   determining weighted texture prediction use from a difference between normalized density functions for luminance histograms of an original frame and of a reference frame; and
   calculating parameters for weighted texture prediction;
   wherein the method further comprises the step of:
      pre-processing temporal denoising, including:
         providing motion estimation by creating a texture prediction frame for a current frame from a previous frame and a corresponding motion vector;
         performing deblocking of the prediction frame; and
         modifying the current frame based on at least one pixel of the current frame and at least one pixel of the prediction frame:

$I=I+\text{sign}(I-P)\cdot F(\text{abs}(I-P))$, where:
   I is the pixel of the current frame,
   P is same position pixel of the prediction frame after deblocking,
   abs is the absolute value function,
   sign is a sign function (sign(x)=–1, if x<0, sign(x)=0, if x=0, and sign(x)=1, if x>0), and
   F is a discrete time function.

6. The method of claim 5, wherein the discrete time function has the following properties:
   $F(D)$ is sufficiently smooth inside interval $[0; T_2]$;

$F(0)=0$;

$F(D) \ge D/2$ and $F(D) \le D$, if $D \in [0;T_0)$;

$F(D)=D/2$, if $D \in [T_0;T_1)$; and $F(D) \le D/2$ and $F(D) \ge 0$, if $D \in [T_1;T_2)$;

where $T_0$, $T_1$ and $T_2$ are predetermined parameters which control strength of noise suppression, $0 \le T_0 < T_1 < T_2$.

7. The method according to claim 6, wherein the de-noising is not performed if a motion vector function mv_cost exceeds a pre-defined threshold.

* * * * *

UNITED STATES PATENT AND TRADEMARK OFFICE
CERTIFICATE OF CORRECTION

PATENT NO. : 8,023,562 B2  
APPLICATION NO. : 12/205482  
DATED : September 20, 2011  
INVENTOR(S) : Alexander Zheludkov et al.

Page 1 of 1

It is certified that error appears in the above-identified patent and that said Letters Patent is hereby corrected as shown below:

In Claim 1: Col. 14, Line 48, delete "encoding," and insert -- encoding --.

Signed and Sealed this
Sixth Day of December, 2011

David J. Kappos
*Director of the United States Patent and Trademark Office*